United States Patent
McMillan

(10) Patent No.: US 9,476,531 B2
(45) Date of Patent: Oct. 25, 2016

(54) ELLIPTICAL FLOW CONDITIONING PIPE ELBOW

(75) Inventor: David T. McMillan, Boulder, CO (US)

(73) Assignee: Dieterich Standard, Inc., Boulder, CO (US)

(*) Notice: Subject to any disclaimer, the term of this patent is extended or adjusted under 35 U.S.C. 154(b) by 264 days.

(21) Appl. No.: 11/829,685

(22) Filed: Jul. 27, 2007

(65) Prior Publication Data

US 2009/0026761 A1     Jan. 29, 2009

(51) Int. Cl.
*F16L 43/00* (2006.01)

(52) U.S. Cl.
CPC ................... *F16L 43/00* (2013.01)

(58) Field of Classification Search
USPC ............................... 285/179; 138/39
See application file for complete search history.

(56) References Cited

U.S. PATENT DOCUMENTS

| | | | | |
|---|---|---|---|---|
| 3,250,469 A | * | 5/1966 | Colston | 235/200 PF |
| 3,411,451 A | * | 11/1968 | Heinz-Bernd et. al. | 285/179 |
| 3,623,511 A | * | 11/1971 | Levin | F16L 43/00 138/39 |
| 3,920,271 A | * | 11/1975 | Bluestone | 285/148.22 |
| 4,019,537 A | * | 4/1977 | Bonnard et al. | 138/37 |
| 4,314,861 A | * | 2/1982 | Murakami et al. | 148/592 |
| 4,744,695 A | * | 5/1988 | Lindsey et al. | 285/179 |
| 5,625,948 A | * | 5/1997 | Kuroda et al. | 29/890.149 |
| 6,422,608 B1 | * | 7/2002 | Lee et al. | 285/179 |
| 2008/0092975 A1 | * | 4/2008 | Grimes et al. | 285/179 |
| 2008/0106095 A1 | * | 5/2008 | Harris et al. | 285/179 |

* cited by examiner

*Primary Examiner* — Aaron Dunwoody
(74) *Attorney, Agent, or Firm* — Westman, Champlin & Koehler, P.A.

(57) ABSTRACT

A pipe elbow for conditioning the flow of fluid through the elbow so that separate flow conditioners or a flow straightener need not be inserted between the elbow and a flow measurement device, comprising, a fluid carrying conduit elbow having first and second ends of circular cross section for connection to straight piping and having a bend intermediate the ends, wherein a lateral cross section of the conduit at the bend is elliptical in shape.

10 Claims, 2 Drawing Sheets

ELLIPTICAL FLOW CONDITIONING PIPE ELBOW

FIELD OF THE INVENTION

The present invention relates generally to apparatus for conditioning the profile and straightening the eddies and other turbulence in fluid flowing through an elbow in a conduit.

BACKGROUND OF THE INVENTION

It is well know in the science of fluid mechanics that pipe elbows, valves and other physical disturbances in a fluid carrying conduit produce asymmetric changes in the fluid's velocity profile, eddy currents and other forms of fluid turbulence. Such disruptions in the laminar flow of the fluid are inconsistent with accurate flow rate measurement. Accordingly, without some kind of conditioning or straightening of the flow, a flow meter must be positioned a considerable distance from the element causing the turbulence. Often a straight run of pipe of up to ten pipe diameters is necessary before the fluid is in condition to be accurately measured for its flow rate.

Not surprisingly, this problem has seen the development of many types of apparatus to be placed downstream of a flow disturbing element to condition and straighten the fluid's flow before its contact with a flow meter. Such apparatus eliminates the need for multiple diameters of straight pipe upstream of a flow meter. Examples of such devices are seen in U.S. Pat. No. 3,733,898 for Flow Conditioning Apparatus, U.S. Pat. No. 5,596,152 for Flow Straightener for Turbine-Wheel Gasmeter, and U.S. Pat. No. 5,341,848 for Flow Conditioner, to name just a few. The problem with apparatus of the types disclosed in these and other patents is that they must be installed in the pipe line as an additional piece of equipment. Incident to such installation is initial cost, maintenance, pressure drop in the line and occupied space in the piping system.

In place of adding additional components into the pipe line it would be desirable to place the conditioning device in or combine it with the element that causes the problem in the first place. Accordingly, in view of this objective and because pipe elbows are the most frequent cause of laminar flow disturbance in fluid processing systems, it would be advantageous to provide a pipe elbow that not only serves its function of changing the direction of fluid flow, but at the same time maintains laminar flow.

It is therefore the primary object of the present invention to provide a pipe elbow that does not disturb the fluid passing through it so as to require subsequent flow conditioning.

A further object of the invention is to provide a pipe elbow whose configuration will condition flow disturbances that are created upstream of the elbow so that fluid exiting the elbow will be in proper condition for flow rate or other process measurement.

A still further object of the invention is to provide a fluid conditioning pipe elbow that will not produce a pressure drop in excess of that produced by a traditional pipe elbow.

SUMMARY OF THE INVENTION

The pipe elbow of the present invention contains traditional circularly shaped inlet and outlet ends for connection by flanges, threads, welding or other means to adjacent pipes in the processing system. At the axial center of the bend in the pipe that forms the elbow the lateral cross section of the pipe is substantially elliptical with the area of the ellipse being equal to the circular area of the inlet or the outlet of the elbow. The elbow contains no interior tabs, fins or other obstructions that will cause a pressure drop. The inside surfaces of the elbow are smooth.

DETAILED DESCRIPTION OF PREFERRED EMBODIMENT

Figure 1:
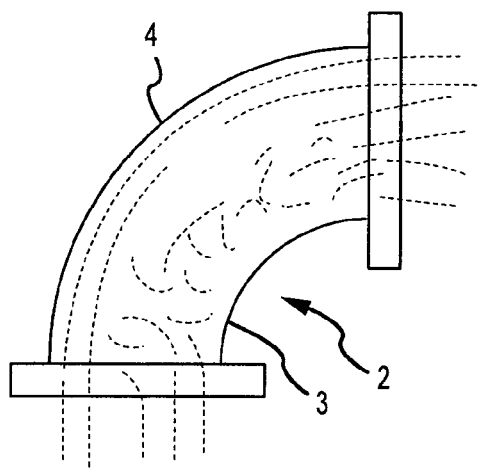
FIG. 1 is a side view of a prior art pipe elbow diagrammatically showing the turbulence and swirling created in the fluid flowing through the elbow.

When fluid flows through the constant circular cross section of a traditional pipe elbow 2 the fluid nearest the inside 3 of the bend in the pipe flows at a slower rate than the fluid close to the outside 4 of the bend, as seen in FIG. 1. This difference in fluid velocity causes a skewed velocity profile at the exit of the elbow. When two elbows are placed in series and they are out of plane with one another, swirl is also generated in the fluid causing eddy currents to form. Whether the disturbance in the fluid is a skewed velocity profile or eddy currents, or both, it is impossible to use a standard orifice plate or an averaging pitot tube type of flow meter anywhere close to the last elbow in the series.

By employing the conditioning elbow of the present invention, shown in FIGS. 2-7, a flow meter can be installed in the pipe immediately downstream of the conditioning elbow without having to utilize a prior art conditioner or flow straightener intermediate the elbow and the flow meter.

The flow conditioning elbow 6 of the present invention includes pipe wall 8 that forms the elbow, together with circular end flanges 10 and 12 at the inlet and outlet ends of the elbow respectively. Coupling threads or welding can be substituted for the flanges in making the connections to adjoining pipes. The flanges are in the same respective positions as the flanges of the standard pipe elbow being replace by the elbow of the present invention. That is, the intersection of lines 14 and 15 that are perpendicular to the planes of the respective flanges 10 and 12 and pass through the centers of the flanges are equal in length from the flange centers to their point of intersection. The terminal ends of the elbow at their respective points of connection with the flanges 10 and 12 are of conventional circular cross section.

Figure 4:
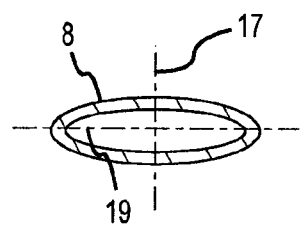
FIG. 4, is a lateral cross sectional view of the pipe elbow of the present invention taken along lines 4-4 in FIG. 2.
Figure 5:
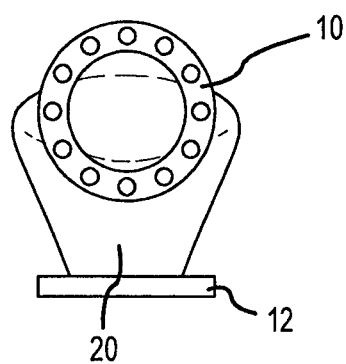
FIG. 5 is an inlet end view of the conditioning elbow of the present invention.
Figure 6:
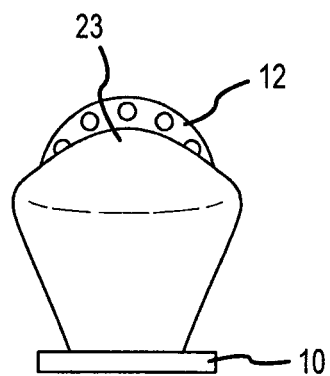
FIG. 6 is a top view of the conditioning elbow of the present invention.
Figure 7:
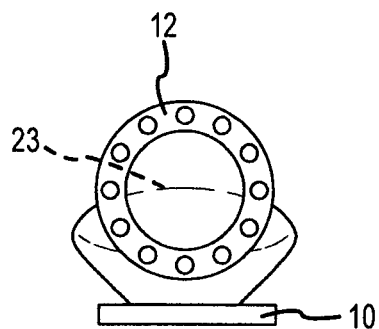
FIG. 7 is an outlet end view of the conditioning elbow of the present invention.

From the inlet end of the elbow, at the connecting flange 10, the pipe wall transmutes to an elliptically shaped cross section, shown in FIG. 4. In this transition from a circular to an elliptically shaped cross section the walls 8 of the pipe are symmetrically distanced from the center line 14.

The area of the elliptically shaped cross section should be the same as the area of the inlet end of the elbow at the inlet flange 10 in order to avoid the turbulence associated with pressure changes in the fluid between the circular inlet and the elliptically shaped cross section area. To substantially reduce or eliminate turbulent flow through the elbow it is also desirable to minimize the height, or length of the minor axis, of the elliptically shaped section. When referring to the elliptically shaped section it is not meant to imply that this section be mathematically a precise ellipse. However, in the preferred form of the elbow the minor axis 17 should be no larger than a quarter of the length of the major axis 19. Such shaping substantially reduces the difference in velocity between that portion of the fluid flow on the outside of the bend and the fluid flow on the inside of the bend.

Figure 2:
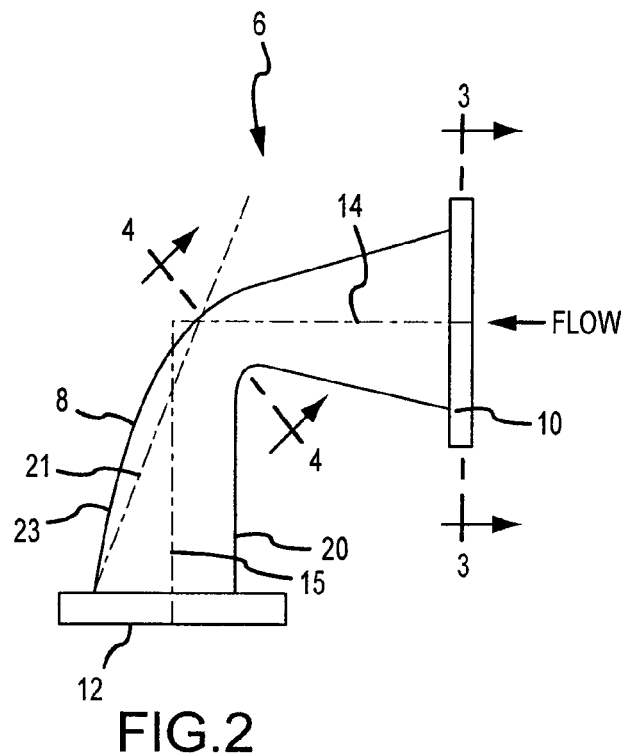
FIG. 2 is a side view of the fluid conditioning elbow of the present invention.
Figure 3:
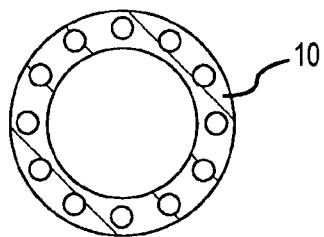
FIG. 3, is a lateral cross sectional view of the pipe elbow of the present invention taken along lines 3-3 in FIG. 2.

The mid point of the elbow bend is located on the angularly related plane of the elliptically shaped area of the elbow, illustrated in FIG. 2 with the section lines 4-4. In a ninety degree elbow that plane is at an angle to the plane of the inlet flange of approximately 45°. For other angles of elbow bend the plane of the elliptical cross section should be approximately one half of the total bend angle.

The transition in the pipe wall from the plane of elliptical cross section to the circular end of the elbow at the outlet flange 12 is different that the inlet side transition. If the transition were symmetrical, as in the inlet side, the fluid on the outside of the curve would travel faster than the fluid on the inside of the curve causing an irregular flow profile at the outlet end. To counteract this tendency, the flow on the outside of the transition is slowed relative to the flow on the inside portion of the transition. The transition from the elliptically shaped section to the outlet flange 12 is non-symmetrical to the center line 15. While the inside 20 of the outlet transition is substantially parallel with the center line 15, the outside portion 23 is arcuately shaped over a line 21 that interconnects the outside of the elliptically shaped portion and the outside of the pipe elbow at the outlet flange 12. That is, the pipe wall on the outside portion 23 of the outlet side of the bend in the elbow expands from the elliptically shaped portion at an angle, with respect to the outlet side line, transmuting into a circular cross section of pipe that terminates in the end flange 12.

In operation the elliptically shaped portion of the bend in the pipe elbow maintains consistent pressure in the flowing fluid with that in the upstream pipe. In addition, because the pipe is "thinner" in height through the elliptical bend the fluid will have a substantially smaller separated region than in a comparable standard pipe elbow resulting in significant reduction, if not elimination, of turbulence in the fluid. The flow profile distortion associated with standard pipe elbows is eliminated by the novel construction of the pipe transition on the outlet side of the elliptically shaped bend where the velocity of the fluid on the inside of the bend is made substantially equal to the fluid velocity on the outside portion of the transition to a circular shape. With the reduction or elimination of turbulent flow through the elbow and the production of a symmetrical flow profile at the output end of the elbow, the fluid is in condition to be immediately subject to flow rate measurement without the use of an intervening flow conditioner.

What is claimed is:

1. A flow conditioning pipe elbow comprising:
a section of fluid carrying conduit having first and second ends of circular cross section and a bend intermediate the ends, wherein a lateral cross section of the conduit at the bend is elliptical in shape, each of the circular cross sections and the elliptical shaped cross section having an area, where the area of the elliptical cross section of the conduit is equal to the area of the circular cross sections forming the first and second ends of the conduit.

2. The pipe elbow of claim 1 where the bend is ninety degrees.

3. The pipe elbow of claim 1 where the major axis of the elliptical area is four times the radius of the circular cross section of the first and second ends and the minor axis of the elliptical area is equal to the radius of the said circular cross sections.

4. The pipe elbow of claim 3 and further including annular flanges attached to each of the first and second ends of the fluid carrying conduit.

5. The pipe elbow of claim 1 where the bend is ninety degrees.

6. A flow conditioning pipe elbow comprising,
a continuous fluid carrying conduit having,
a first section having a circularly shaped open end,
a second section whose lateral cross section is in the form of an ellipse, and
a third section having a circularly shaped planar section,
where the conduit transmutes from the circular shape of the first section to the elliptical shape of the second section and transmutes from the elliptical shape of the second section to the circular shape of the third section, and
where the transition from the second section to the third section comprises an inside portion that is parallel to a line perpendicular to the planar third section and an outside section that is arcuately shaped.

7. The pipe elbow of claim 6 where the second section defines a bend in the conduit.

8. The pipe elbow of claim 7 where the bend is ninety degrees.

9. A flow conditioning pipe elbow comprising,
a continuous fluid carrying conduit having,
a first section having a circularly shaped open end,
a second section whose lateral cross section is in the form of an ellipse, and
a third section having a circularly shaped planar section,
where the area of the elliptical cross section of the second section is equal to the area of the circular shapes forming the first and third sections of the conduits, and
where the conduit transmutes from the circular shape to the first section to the elliptical shape of the second section and transmutes from the elliptical shape of the second section to the circular shape of the third section.

10. The pipe elbow of claim 9 where the second section defines a bend in the conduit.

* * * * *